US010815878B2

(12) United States Patent
Rainey et al.

(10) Patent No.: US 10,815,878 B2
(45) Date of Patent: Oct. 27, 2020

(54) HOMOGENEOUS CHARGE COMPRESSION IGNITION LINEAR GENERATOR (71) Applicant: The Government of the United States of America, as represented by the Secretary of Homeland Security, Washington, DC (US)

(72) Inventors: Shane R. J. Rainey, New London, CT (US); Thomas C. Rodzewicz, New London, CT (US); Julian J. Blanco, New London, CT (US); Ryan T. Ostrander, New London, CT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 317 days.

(21) Appl. No.: 15/915,877

(22) Filed: Mar. 8, 2018

(65) Prior Publication Data

US 2018/0258845 A1 Sep. 13, 2018

Related U.S. Application Data (60) Provisional application No. 62/469,751, filed on Mar. 10, 2017.

(51) Int. Cl.
*F02B 63/04* (2006.01)
*F02D 13/02* (2006.01)
(Continued)

(52) U.S. Cl.
CPC .......... *F02B 63/041* (2013.01); *F01B 11/004* (2013.01); *F01B 11/02* (2013.01);
(Continued)

(58) Field of Classification Search
CPC ........ F02B 63/041; F02B 71/00; F02B 75/24; F02B 1/14; F02B 2075/1808; F02B 47/02;
(Continued)

(56) References Cited

U.S. PATENT DOCUMENTS 4,270,054 A * 5/1981 Dowd ..................... F01B 9/047
290/1 R
4,532,431 A 7/1985 Iliev et al.
(Continued)

FOREIGN PATENT DOCUMENTS

GB 2480461 A 11/2011

OTHER PUBLICATIONS

Jun, Wei, Dr. "Benchmarking and the Future of Additive Manufacturing." Principles and Applications (with Companion Media Pack) Fourth Edition of Rapid Prototyping 3D Printing and Additive Manufacturing, 2014, pp. 467-501, World Scientific Publishers, Hackensack, New Jersey, US.
(Continued)

*Primary Examiner* — Hung Q Nguyen
(74) *Attorney, Agent, or Firm* — Lavanya Ratnam; Kelly G. Hyndman (57) ABSTRACT

A homogeneous charge compression ignition free-piston linear generator is disclosed. The linear generator includes a housing having cylinders at opposite ends. A double-ended piston assembly is to move linearly in the housing to convert kinetic energy of the piston assembly into electrical energy, and to enable conversion of electrical energy into kinetic energy of the piston assembly. Sensors measure one or more states of the cylinders and/or piston assembly, and a controller controls the linear generator based on the sensor data.

17 Claims, 5 Drawing Sheets

(51) Int. Cl.

| | | |
|---|---|---|
| *F02D 41/14* | (2006.01) | |
| *F02D 41/30* | (2006.01) | |
| *F02B 75/24* | (2006.01) | |
| *F02N 11/04* | (2006.01) | |
| *H02K 7/18* | (2006.01) | |
| *H02P 9/04* | (2006.01) | |
| *F01B 11/00* | (2006.01) | |
| *H02P 25/06* | (2016.01) | |
| *F02B 71/00* | (2006.01) | |
| *F01B 11/02* | (2006.01) | |
| *H02P 9/00* | (2006.01) | |
| *F02M 25/03* | (2006.01) | |
| *F02B 1/14* | (2006.01) | |
| *F02B 75/18* | (2006.01) | |
| *F02D 41/00* | (2006.01) | |
| *F02B 47/02* | (2006.01) | |
| *F02D 41/34* | (2006.01) | |
| *F02M 25/025* | (2006.01) | |
| *F02D 15/00* | (2006.01) | |

(52) U.S. Cl.
CPC ............. *F02B 71/00* (2013.01); *F02B 75/24* (2013.01); *F02D 13/0215* (2013.01); *F02D 41/1443* (2013.01); *F02D 41/3035* (2013.01); *F02M 25/03* (2013.01); *F02N 11/04* (2013.01); *H02K 7/1884* (2013.01); *H02P 9/00* (2013.01); *H02P 9/04* (2013.01); *H02P 25/06* (2013.01); *F02B 1/14* (2013.01); *F02B 47/02* (2013.01); *F02B 2075/1808* (2013.01); *F02D 15/00* (2013.01); *F02D 41/009* (2013.01); *F02D 41/34* (2013.01); *F02D 2041/001* (2013.01); *F02D 2200/021* (2013.01); *F02D 2200/024* (2013.01); *F02M 25/025* (2013.01)

(58) Field of Classification Search
CPC .......... F01B 11/004; F01B 11/02; H02P 9/04; H02P 25/06; H02P 9/00; F02M 25/03; F02M 25/025; F02N 11/04; H02K 7/1884; F02D 2041/001; F02D 41/34; F02D 13/0215; F02D 41/1443; F02D 41/3035; F02D 15/00; F02D 2200/021; F02D 41/009; F02D 2200/024
See application file for complete search history.

(56) References Cited

U.S. PATENT DOCUMENTS

| | | | | |
|---|---|---|---|---|
| 5,347,186 A * | 9/1994 | Konotchick | ......... | H02K 7/1876 310/17 |
| 5,775,273 A * | 7/1998 | Beale | ..................... | F02B 71/00 123/46 B |
| 6,199,519 B1 * | 3/2001 | Van Blarigan | .......... | F02B 71/04 123/46 R |
| 7,308,872 B2 | 12/2007 | Sellnau et al. | | |
| 8,413,617 B2 | 4/2013 | Simpson et al. | | |
| 9,032,918 B2 | 5/2015 | Mikalsen et al. | | |
| 10,498,208 B1 * | 12/2019 | Kebabian | ................ | H02K 35/04 |
| 2005/0103287 A1 * | 5/2005 | Hofbauer | .................. | F02B 1/12 123/46 E |
| 2007/0158947 A1 * | 7/2007 | Annen | .................... | F02B 63/04 290/1 R |

OTHER PUBLICATIONS

What is Electric Power [online]. Rapidtables.com [retrieved on Jan. 4, 2018]. Retrieved from the Internet: <URL: www.rapidtables.com/electric/electric_power.html>.

Additive Manufacturing, Laser-Sintering and Industrial 3D Printing—Benefits and Functional Principle [online]. EOS GmbH [retrieved on Jan. 3, 2018]. Retrieved from the Internet: <URL: www.eos.info/additive_manufacturing/for_technology_interested>.

Faraday's Law—Coils and Magnets, How to Build your Alternator / Generator [online]. 6pie.com [retrieved on Jan. 4, 2018]. Retrieved from the Internet: <URL: www.6pie.com/faradayslaw.php>.

Saxena et al., "Fundamental Phenomena Affecting Low Temperature Combustion and HCCI Engines, High Load Limits and Strategies for Extending These Limits", Progress in Energy and Combustion Science 39 (2013), pp. 457-488.

Goldsborough et al., "A Numerical Study of a Free Piston IC Engine Operating on Homogeneous Charge Compression Ignition Combustion", SAE Technical Paper 1999-01-0619 (1999).

Goldsborough et al., "Optimizing the Scavenging System for a Two-Stroke Cycle, Free Piston Engine for High Efficiency and Low Emissions: A Computational Approach", International Multidimensional Engine Modeling User's Group Meeting at the SAE Congress (2003).

Goto et al., "Development of Free Piston Engine Linear Generator System Part 2—Investigation of Control System for Generator", SAE Technical Paper 2014-01-1193 (2014).

Hellstrom et al., "Reducing Cyclic Variability While Regulating Combustion Phasing in a Four-Cylinder HCCI Engine", IEEE Transactions on Control Systems Technology, vol. 22, No. 3, (May 2014), pp. 1190-1197.

Aspin et al., "The Hybrid Tug Reality—The Business Case for Green Technology in the Tugboat Industry", Tugnology 09, Amsterdam, The Netherlands, Organised by the ABR Company Ltd, Day 1, Paper No. 2 (2009).

Car Emissions and Global Warming [online]. Union of Concerned Scientists [retrieved on Jan. 4, 2018]. Retrieved from the Internet: <URL: www.ucsusa.org/clean-vehicles/car-emissions-and-global-warming>.

Agarwal et al., "Characterization of Exhaust Particulates from Diesel Fueled Homogenous Charge Compression Ignition Combustion Engine", Journal of Aerosol Science 58 (2013), pp. 71-85.

Chiong et al., "Nozzle Steam Piston Expander for Engine Exhaust Energy Recovery", SAE Technical Paper 2015-01-0126 (2015).

Cuk, Slobodan, "98% Efficient Single-Stage AC/DC Converter Topologies", Power Electronics Europe, Issue 4 (2011).

Lou et al., "Camless Variable Valve Actuator with Two Discrete Lifts", SAE Technical Paper 2015-01-0324 (2015).

McKenna, Rick, "Campbell Foss: Hybrid Retrofit Final Report", Foss Maritime Company (2016).

Neodymium Ring Magnet Specifications [online]. K&J Magnetics: RX8CC [retrieved on Jan. 4, 2018]. Retrieved from the Internet: <URL: www.kjmagnetics.com/proddetail.asp?prod=RX8CC>.

Nitrogen Oxides (NOx)—Regulation 13 [online]. International Maritime Organization [retrieved on Jan. 4, 2018]. Retrieved from the Internet: <URL: www.imo.org/en/OurWork/Environment/PollutionPrevention/AirPollution/Pages/Nitrogen-oxides-(NOx)-Regulation-13.aspx>.

Hibbard, Dawn, "Fewer Moving Parts is the Key to Better Engines" [online]. Kettering News, 2003 [retrieved on Jan. 4, 2018]. Retrieved from the Internet: <URL: news.kettering.edu/news/fewer-moving-parts-key-better-engines>.

Izadi et al., "Validation of a Reduced Chemical Mechanism Coupled to CFD Model in a 2-Stroke HCCI Engine", SAE Technical Paper 2015-01-0392 (2015).

Janakiraman et al., "Identification of the Dynamic Operating Envelope of HCCI Engines Using Class Imbalance Learning", IEEE Transactions on Neural Networks and Learning Systems, vol. 26, No. 1 (Jan. 2015).

Kamboj et al., "Effects of Compression Ratios, Fuels and Specific Heats on the Energy Distribution in Spark-Ignition Engine", International Journal of Emerging Technology and Advanced Engineering, vol. 2, Issue 8 (Aug. 2012).

Electromechanical Valve Actuator for Variable Valve Timing. [online]. LaunchPoint Technologies Inc. [retrieved on Jan. 4, 2018]. Retrieved from the Internet: <URL: www.launchpnt.com/portfolio/transportation/electromechanical-valve-actuator>.

(56) References Cited

OTHER PUBLICATIONS

Kock et al., "The Free Piston Linear Generator—Development of an Innovative, Compact, Highly Efficient Range-Extender Module." SAE Technical Paper 2013-01-1727 (2013).

Light-Duty Vehicles, Light-Duty Trucks, and Medium-Duty Passenger Vehicles: Tier 2 Exhaust Emission Standards and Implementation Schedule. United States Environmental Protection Agency, Office of Transportation and Air Quality, EPA-420-B-17-028.

Truedsson et al., "Engine Speed Effect on Auto-Ignition Temperature and Low Temperature Reactions in HCCI Combustion for Primary Reference Fuels", SAE Technical Paper 2014-01-2666 (2014).

Hutchinson, Harry, "Variable-Valve HCCI: A Challenge of Timing." Mechanical Engineering 7 (2007), pp. 21-22.

Jia et al., "Development Approach of a Spark-Ignited Free-Piston Engine Generator", SAE Technical Paper 2014-01-2894 (2014).

Light-Duty Vehicle Greenhouse Gas Emissions and Corporate Average Fuel Economy Standards, Department of Transportation, Environmental Protection Agency, Federal Register Rules and Regulations, vol. 77, No. 199 (Oct. 2012).

Shake Flashligh [online]. K&J Magnetics, Inc. [retrieved on Jan. 4, 2018]. Retrieved from the Internet: <URL: www.kjmagnetics.com/blog.asp?p=shake-flashlight>.

Sun et al., "Investigation of Control Method for Starting of Linear Internal Combustion Engine-Linear Generator Integrated System", SAE Technical Paper 2015-01-1729 (2015).

Model S Batter Voltage? [online]. Tesla Motors Club, 2013 [retrieved on Jan. 4, 2018]. Retrieved from the Internet: <URL: teslamotorsclub.com/tmc/threads/model-s-battery-voltage.22341>.

Van Blarigan et al., "Homogeneous Charge Compression Ignition Free Piston Linear Alternator", Sandia Report, SAND99-8206 (Nov. 2018).

\* cited by examiner

HOMOGENEOUS CHARGE COMPRESSION IGNITION LINEAR GENERATOR

CROSS-REFERENCE TO RELATED APPLICATIONS

This application claims the benefit of U.S. Provisional Application No. 62/469,751 entitled "Homogeneous Charge Compression Ignition Linear Generator," filed on Mar. 10, 2017, which is hereby incorporated by reference in its entirety.

STATEMENT OF GOVERNMENT INTEREST

The present invention was made by one or more employees of the United States Department of Homeland Security in the performance of official duties, and, thus the claimed invention may be manufactured, used, licensed by or for the United States without the payment of any royalties thereon.

FIELD OF THE INVENTION

The present disclosure generally relates to a linear generator. More particularly, the present disclosure relates to a free-piston linear electric generator (also known as a linear alternator) utilizing Homogeneous Charge Compression Ignition (HCCI) (also known as controlled auto ignition) and a variable state controller to effectively control multiple states of the linear generator.

BACKGROUND

HCCI is an engine technology that can significantly improve fuel economy. In operation, HCCI power cycles combust substantially the entire stoichiometric, well-mixed fuel-air mixture simultaneously, utilizing the fuel source. Idealized HCCI does not create centralized burn points, so there is no flame propagation, unlike in normal spark ignition or compression ignition combustion engines. These attributes of HCCI allow for low emissions of nitrogen oxides, soot, and particulate matters, and the use of oxidation catalysts decreases emissions of unburned hydrocarbons and carbon monoxide. HCCI offers the ability to achieve high efficiencies, in comparison with diesel cycles, while also providing clean emissions.

HCCI involves compressing a well-mixed fuel and oxidizer (typically air) to the point of auto-ignition. One of the challenges with HCCI is its inability to reliably combust both dynamic load and high load applications. Implementing HCCI in a free-piston linear generator that directly powers a battery system addresses this issue as the generator can be used in low-load applications while being run at a constant load. Keeping the generator at a lower speed and load allows more time for an ideal combustion state to be created by the system, while decreasing overall size of the generator relative to comparatively higher speed generators. Additionally, the low mechanical complexity of a linear generator adds significant reliability benefits.

A primary factor inhibiting commercial success of such generators is the difficulty in reliably achieving spontaneous combustion of all the fuel. In an HCCI generators, the compression ratios must be greater than most modern day spark ignition engines to provide the heat necessary for compression-based combustion. If the compression ratio is too small for the combustion phase, the fuel-air mixture will not ignite. If the compression ratio is too large, pre-ignition is likely to occur. The need for a changing compression ratio is why HCCI has such a difficult time being implemented in modern crankshaft engines that operate with singular compression ratios. The difficulty of achieving this near ideal compression ratio on every ignition stroke is why HCCI engines frequently experience knocking, ringing and misfires. This difficulty is further complicated by the complexity of HCCI combustion which is dominated by complex nonlinear dynamics.

Given the high level of precision necessary, previous approaches to control the compression ratio in such a generator by controlling only a single generator state are insufficient.

BRIEF SUMMARY OF EMBODIMENTS OF THE INVENTION

Various embodiments describe homogeneous charge compression ignition linear generators with variable multi-state controllers. Such embodiments may include a housing cylinder having a first and second combustion chamber at opposite ends. Combustion chambers can have one or more inlets and one more or outlets. In some embodiments, the inlets are connected to intake valves that allow or prevent an air fuel mixture from entering the respective combustion chambers. Additionally, in some embodiments, the outlets are connected to exhaust valves that allow or prevent exhaust gas from leaving the respective combustion chamber.

In an embodiment, the generator further includes a double-ended piston adapted to move linearly in the housing cylinder; a linear electromagnetic machine configured to convert kinetic energy of the piston into electrical energy as well as to convert electrical energy into kinetic energy of the piston; sensors configured to measure one or more piston states; and a controller configured to control the piston and valves based on sensor data. The piston has two ends with each end having a piston seal to prevent gas from escaping. The linear electromagnetic machine has two parts—a stator and a translator. The stator (e.g., winding(s)) is attached to the housing cylinder, while the translator (e.g., magnet(s)) is attached to the piston and in embodiments can move linearly within the stator. The linear electromagnetic machine may form a permanent magnet machine, an induction machine, a switched reluctance machine, or a combination of these and/or other options to convert between linear motion of the piston assembly and electrical energy. The sensors can be configured to measure various states of the combustion chambers including temperature and pressure, and various states of the piston including speed and position. This data is then sent to the controller which is configured to implement the data to determine and control the compression ratio of the current stroke's combustion cycle. The controller can control the compression ratio by altering the timing of opening and/or closing any of the intake or exhaust valves, as well as by controlling the piston's movement, including position, speed, and acceleration, via the linear electromagnetic machine.

In some configurations, the generator operates using a two-stroke piston cycle including a compression stroke followed by a power stroke. During the compression stroke, the generator injects/admits fuel and air into the chamber while the piston is driven towards the head of the chamber to compress the fuel and air mixture. Once a predetermined compression ratio is achieved in the chamber, the fuel and air mixture will ignite from the compression (compression ignition) and the power stroke begins. During the power stroke, the combusted fuel and air mixture expands, driving the piston in the opposite direction. The linear electromagnetic machine can convert a portion of the driven piston's kinetic energy into electrical energy. As the two chambers are configured linearly with the piston adapted to move linearly between them, when one chamber is undergoing a power stroke, the other chamber will be undergoing a compression stroke. As discussed above, the generator can also be configured to operate in a four-stroke or six-stroke piston cycle. A four-stroke cycle can include an intake stroke, a compression stroke, a power stroke, and an exhaust stroke. Whereas, a six-stroke cycle can include an intake stroke, a compression stroke, a power stroke, an exhaust stroke, a steam power stroke, and a steam exhaust stroke.

Further, according to an embodiment of the present disclosure, there is provided a method for controlling a Homogeneous Charge Compression Ignition generator. The method includes receiving data from sensors measuring at least one of a combustion chamber temperature, a combustion chamber pressure, a piston speed and a piston position, analyzing the measured data from the sensors to determine a compression ratio, determining and controlling an electromotive force to control a piston movement, determine opening or closing of the first intake valve, the second intake valve, the first exhaust valve, and the second exhaust valve, determine the timing of opening and/or closing of the valves based on the sensor data, execute a variable valve timing process for the first intake valve and the second intake, and execute a variable valve timing process for the first exhaust valve and the second exhaust valve. Additionally, the method can include sensing a total energy state of the cylinder and piston, and adjusting the energy state to achieve a desired HCCI condition suitable for HCCI combustion. For example, the controller control an amount of water and/or fuel injection into the cylinder to control the change in total energy state based on the initial temperatures and masses of the injected fluids, thereby achieving HCCI combustion (which results in energy generation and further change in the total energy state).

The controller can provide a variable multistate control system, enabling implementation of other engine technologies to further improve efficiency relative to a base system not including the technologies. For example, a controlled linear generator implementing HCCI can run in either a four-stroke or six-stroke combustion cycle, e.g., by including a steam cycle to implement the six-stroke combustion cycle. The advantages of a steam cycle are it provides internal cooling/control over the total energy of a cylinder/piston, provides an extra power stroke, and provides cleaning to the inside of the cylinder. The multistate control system can also be used to further increase the scavenging efficiency of the generator using various example approaches. For example, the exhaust valves remain open while the inject speed of the inlet valves are varied to ensure a predetermined compression ratio is achieved.

The forgoing general description of the illustrative implementations and the following detailed description thereof are merely example aspects of the teachings of this disclosure, and are not restrictive of the claimed invention.

Other features and aspects of the invention will become apparent from the following detailed description, which taken in conjunction with the accompanying drawings illustrate, by way of example, the features in accordance with embodiments of the invention. This summary is not intended to identify key or essential features of the claimed subject matter, nor is it intended to limit the scope of the invention, which is defined solely by the claims attached hereto.

BRIEF DESCRIPTION OF THE DRAWINGS

One or more example embodiments are described in detail with reference to the following drawings. These drawings are provided to facilitate understanding of the present invention and should not be read as limiting the breadth, scope, or applicability thereof.

The accompanying drawings, which are incorporated in and constitute a part of the specification, illustrate one or more embodiments and, together with the description, explain these embodiments. Any values and/or dimensions illustrated in the accompanying graphs and figures are for illustration purposes only. Where applicable, some or all features may not be illustrated to assist in the description of underlying features The figures are not intended to be exhaustive or to limit the invention to that represented. In the drawings.

These drawings are not intended to be exhaustive or to limit the disclosure to the precise form(s) shown. It should be understood that the present invention can be practiced with modification and alteration, and that the invention is limited only by the claims and the equivalents thereof.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Furthermore, the terms "substantially," "approximately," "proximate," and similar terms generally refer to ranges that include the identified value within a margin of 20%, 10% or preferably 5% in certain embodiments, and any values there between.

HCCI combustion can be modeled as an Otto cycle, due to the spontaneous combustion of the fuel. The compression ratios are greater than modern day spark ignition engines to provide the heat necessary for compression-based combustion. The greater the engine speed, the greater the compression ratio to allow for increased residence time, e.g., time from inlet valve closing to start of combustion. If the compression ratio is too small for the combustion phase for a given scenario, the fuel-air mixture may not ignite. If the compression ratio is too large, pre-ignition may occur. Changing compression ratio is one reason why HCCI has limited implemented in modern crankshaft engines that operate with singular compression ratios.

Furthermore, HCCI can have a combustion phase of 2,000 μs (two thousand microseconds) compared to 10 μs (ten microseconds) taken by spark ignition engine. More time is related to more heat transfer to the fuel-air mixture thus increasing the likelihood of pre-combustion relative to a lower time combustion phase. Thus, extra residence time enables low temperature heat reactions in HCCI combustion to develop into burn points to begin the higher temperature heat reactions in comparison to lower residence time.

In HCCI, the operating compression ratio of the engine then is governed by a combustion chamber state, such that a desired HCCI combustion chamber/cylinder state can enable desired HCCI combustion to take place in the combustion chamber/cylinder. To maximize the efficiency of this process and optimize steady-state operation, the fuel and air mixture in a combustion chamber should be compressed just to the point of auto-ignition, which can be affected by total energy state of the piston assembly, cylinder, piston, and fuel-air mixture. Such compression ratio may substantially continually change for a given chamber condition prior to combustion, due to the changing nature of the conditions of the chamber during operation and movement of the piston assembly and accompanying temperature/pressure changes. Therefore, the importance of compression ratio in HCCI combustion is twofold- (i) having the predetermined compression ratio for a given cylinder condition provides the predetermined amount of compression heating to produce auto-ignition, and (ii) having the predetermined compression ratio allows sufficient time for low temperature reactions to initiate burn points to ignite the air-fuel mixture.

Figure 1:
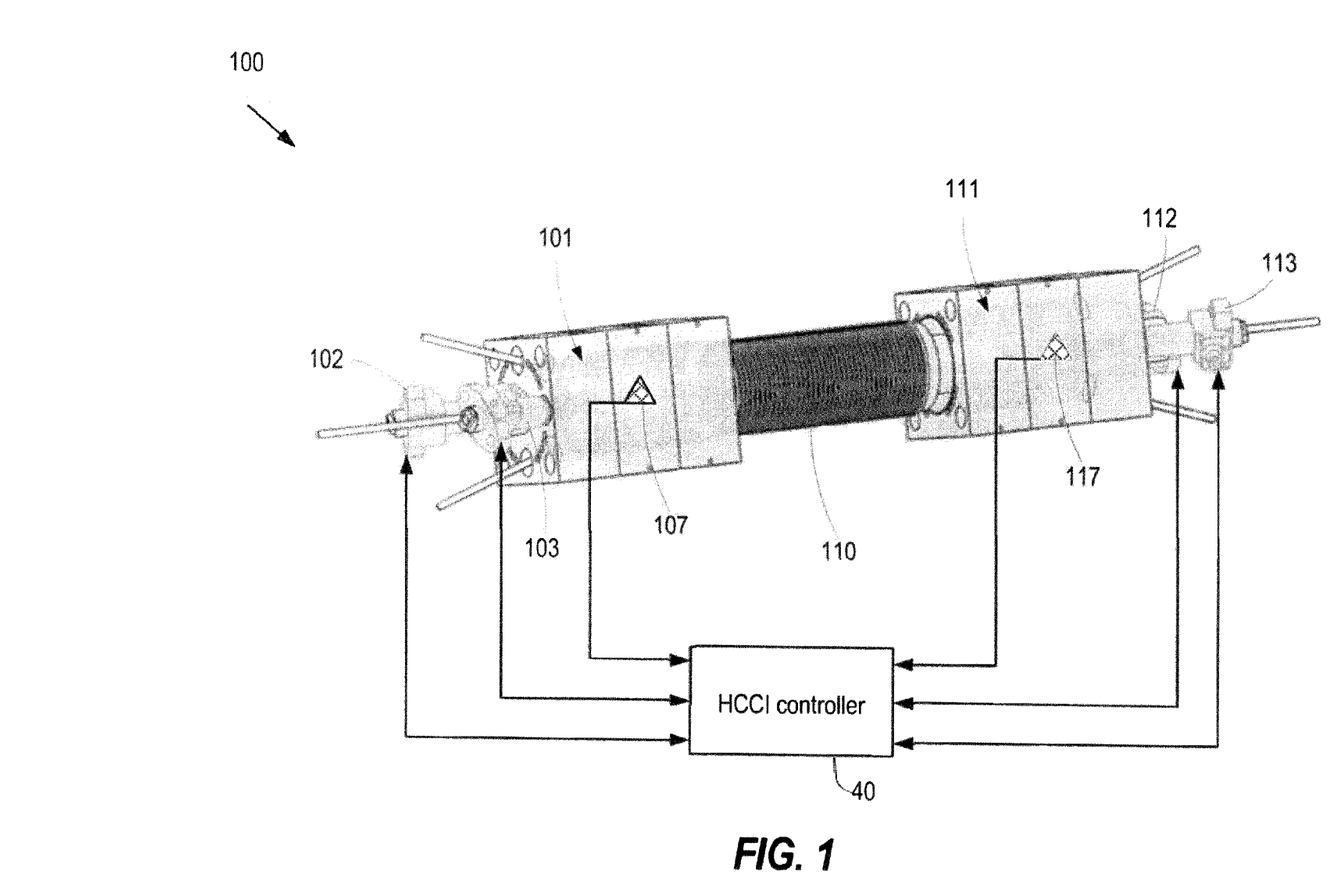
FIG. 1 illustrates a Homogeneous Charge Compression Ignition (HCCI) generator according to an embodiment of the present disclosure.

FIG. 1 illustrates a Homogeneous Charge Compression Ignition (HCCI) linear generator 100 (referred as HCCI generator 100 hereinafter) according to an example embodiment of the present disclosure. The HCCI generator includes a housing having a first combustion chamber 101 formed as a cylinder and connected to a second combustion chamber 111 formed as a cylinder at opposite ends of the housing. The housing is to enclose a piston assembly that reciprocates in the housing (see FIG. 2). The housing includes at least one first valve, shown in FIG. 1 as first intake valve 102 and first exhaust valve 103, and includes at least one second valve, shown as a second intake valve 112 and a second exhaust valve 113. The linear generator also includes a linear electromagnetic machine with a stator 110 and a translator 220 (e.g., at least one magnet). At least one first sensor 107 and at least one second sensor 117 are to provide first sensor data and second sensor data, respectively. The linear generator 100 includes an HCCI generator controller 40 coupled to send and receive data and/or control signals between the sensors 107, 117, valves 102, 103, 112, 113, and linear electromagnetic machine (e.g., to control generated electricity extraction and/or to control position, velocity, and/or acceleration of the piston assembly). The first cylinder 101 is on a first side (left) of the winding 110 and the second cylinder 111 is on a second side (right) of the winding 110. The generator 100 can operate using, and switch seamlessly between, any fuel types, including liquefied natural gas, for HCCI combustion in the first and second cylinders 101, 111.

The first intake valve 102 and the first exhaust valve 103 are connected to the first cylinder 101. The first intake valve 102 can be an electronically controlled valve that can receive control signal from the HCCI generator controller 40. The opening or closing of the first intake valve 102 controls the amount/mass of fuel entering the first cylinder 101. A valve control timing and amount of a fluid such as fuel (or water) entering the first cylinder 101 is based on the sensor data received by the controller 40. For example, a mass of fluid (fuel and/or water) can be used to cool the cylinder to achieve a desired overall cylinder/piston energy state compatible with HCCI combustion, as determined by the controller 40 based on sensor data.

In embodiments, the second cylinder 111 is similar to the first cylinder 101. In an example, a cylinder is constructed from three blocks bolted together. Each block can be fabricated based on additive manufacturing 3D printing. In embodiments such as these, the second intake valve 112 and the second exhaust valve 113 are electronically controlled by the controller 40, and can be directly connected to the second cylinder 111.

The valves 102, 103, 112 and 113 can be mechanically independent from any crankshaft or other such mechanism, and can be operated independently based on control signals from the controller 40. In an embodiment, the controller 40 utilizes a variable valve actuation (VVA) system for controlling valve opening and closing. For example, the valves 102, 103, 112 and 113 are solenoid valves with a travel distance of approximately −0.7 mm to 0.7 mm (negative zero point seven millimeters to zero point seven millimeters) between open and closed states of the respective valves. Further, the valves 102, 103, 112 and 113 can have a switch time between 1.63 to 1.97 ms (one point six three millisecond to one point nine seven milliseconds). As such, the valves are compatible with operating the HCCI linear generator at 700 (seven hundred) cycles per minute (cpm), which provides a total available switch time of 85 ms (eighty-five milliseconds) for the valves to operate. In such an example generator operation, the switch time of the valves takes approximately 2% (two percent) of the stroke time available. Utilizing VVA enables optimizing the valve timing within the available switch time to maximize performance compatible with desired HCCI cylinder state for HCCI combustion. The power consumption of 36W (thirty-six Watts) to operate such example electronically actuated valves would be inconsequential to the amount of total power generated by the linear generator system.

The variable valve actuation (VVA) can be achieved by implementing variable valve timing (VVT) process within the controller 40. The VVT can allow for an optimal valve opening and closing sequences with different engine operations. Such a VVT process permits valve operation based on controller signals, independent of mechanical inputs which might be subject to traditional fixed crank angles due to a mechanic connection of traditional cams and/or crankshaft. Thus, the controller 40 can adjust valve timing for different engine speeds, thereby increasing combustion efficiency and reducing exhaust pollutants. Furthermore, The VVT process enables valves to be controlled in real-time to provide a desired amount of air intake and exhaust compatible with achieving stoichiometric mixing and high scavenging efficiency as part of the desired cylinder state for each HCCI combustion cycle. Such valve operation can be based on various actuation technologies, such as controlling the valves 102, 103, 112 and 113 based on electro-magnetic, electro-hydraulic, or electro-pneumatic actuation.

The sensors 107 and 117 can be one or more sensors such as proximity sensors, speed sensors, temperature sensors, hall-effect sensors, pressure sensors, and other various sensors usable by the controller 40 to identify a cylinder state. For example, the sensors can be used to measure (for the entire housing, piston assembly, and/or for a given individual cylinder and/or piston) a piston position, a piston speed, a cylinder pressure, a cylinder temperature, including temperatures for the cylinder air, cylinder walls, and/or piston, in order to identify a total energy state of the cylinder/piston that affect HCCI combustion in their respective cylinder/combustion chamber. The sensor 107 and 117 can send the measured parameters to the controller 40 to further determine control action.

The controller 40 can be configured to control different features of the HCCI generator 100. Features of the HCCI generator 100 that are controlled include, but are not limited to, adjusting a cylinder state characterized by a piston speed (e.g., by controlling the winding 110 to influence the piston assembly), variable valve actuation of the valves 102, 103, 112, and 113, controlling a uniflow exhaust from the cylinders 101 and 111, controlling a fluid (fuel, water, etc.) injection into the cylinders 101 and 111, operating the HCCI generator 100 at a constant and low speed, and controlling cooling of the cylinders 101 and 111 (e.g., based on a mass of fluid injection or other control inputs to affect temperature). For example, alternatively or in addition, the HCCI generator can include a steam cycle, discussed in greater detail below, which can be used to effect total cylinder energy and to provide cooling to the HCCI linear generator.

Figure 2:
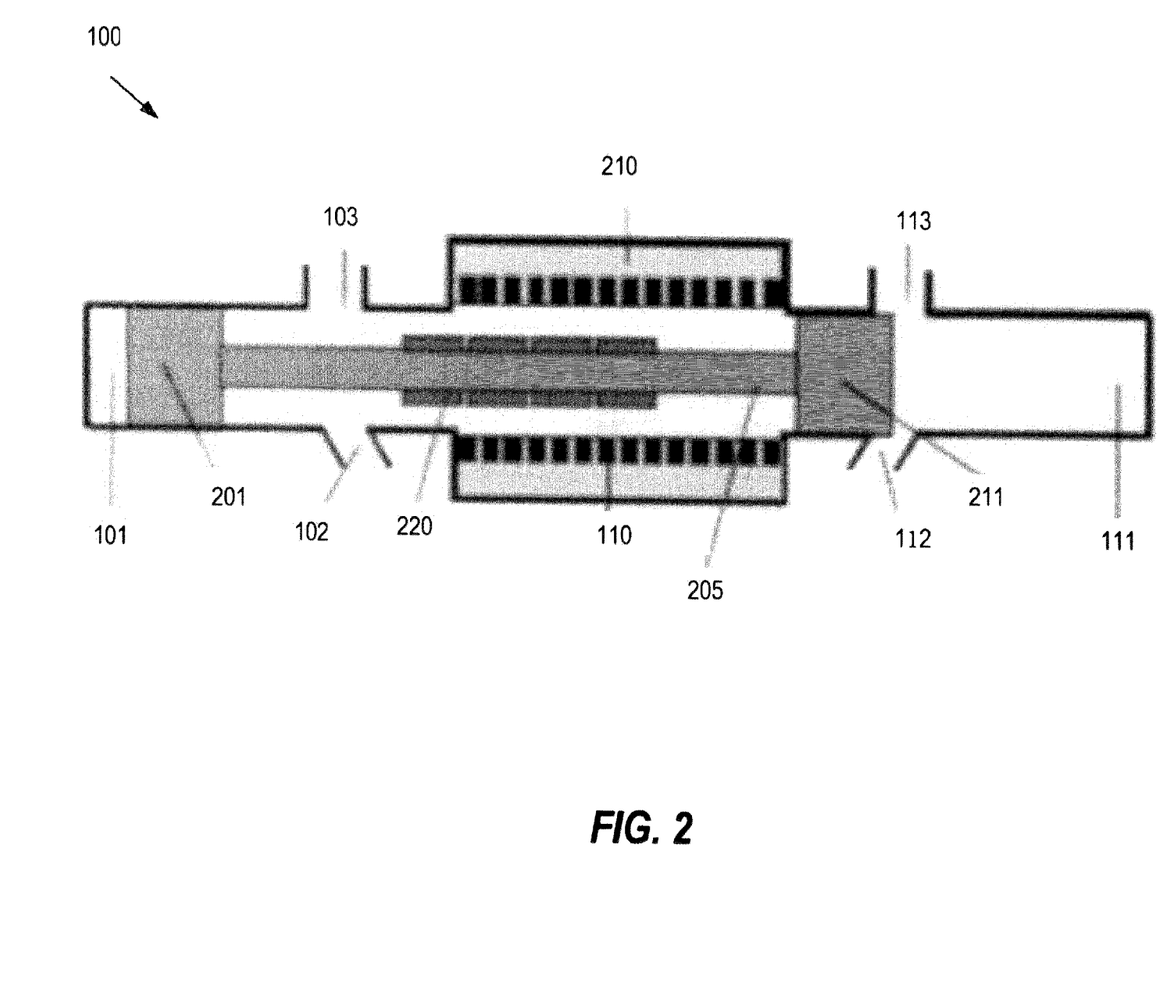
FIG. 2 is a cross-section view illustrating an HCCI generator according to an embodiment of the present disclosure.

FIG. 2 is a cross-section view illustrating the HCCI generator of FIG. 1 according to an example embodiment of the present disclosure. The HCCI generator can include an iron core 210 to support the windings 110, and the first cylinder 101 and the second cylinder 111 can be integrally formed with the iron core 210 creating a unitary construction. In other embodiments, the windings 110 are wound around a section of the housing between the first and second cylinders 110, 111, e.g., a non-metal portion of the housing between cylinders, which can be produced by additive manufacturing 3D printing.

The first cylinder 101 includes a first piston 201 that can freely reciprocate within the first cylinder 101. Similarly, the second cylinder 111 includes a second piston 211 that can reciprocate within the second cylinder 111. The pistons 201 and 211 are connected by a connecting rod 205, to form a piston assembly. In an alternate example embodiment, the piston assembly can be formed as a unitary double-ended piston. On the connecting rod 205, approximately at the center, a permanent magnet 220 is attached. The permanent magnet can be a single neodymium magnet, and the winding 110 can include approximately 95 wraps of conducting wire, which can generate an EMF of approximately 5 Volts (five Volts).

Advantages of a free-piston engine include substantially reduced vibration during operation, reduced frictional losses due to mechanical simplicity, elimination of side force, and multi-fuel possibilities due to variable compression ratio. Furthermore, with fewer moving parts, there is less friction, wear and noise. This could also make engines smaller, more compact and weigh less in comparison to spark ignition engines.

In embodiments, the pistons 201 and 211 are not connected to a crankshaft and are substantially free to reciprocate within the cylinders 101 and 111. Furthermore in embodiments consistent with this disclosure, the valves 102, 103, 112 and 113 are not connected to a camshaft.

The challenge with such generators is the steadiness of the combustion process and piston control in real time and includes complex electronic control. The HCCI generator 100 can control the free-piston movement by controlling the power to the linear electromagnetic machine via the controller 40, e.g., based on control signals to/from winding 110.

During startup, power can be introduced to the winding 110 in order to cause the pistons 201 and 211 to rock back and forth, creating initial intake strokes and gaining momentum. Responsive to generating momentum, the piston is able to create the necessary pressure to ignite the fuel-air mixture. This embodiment of the linear generator system finds the minimum number of drive cycles to start the engine is four. Both position tracking and velocity tracking of the piston assembly and/or individual pistons 201, 211 can be used to ensure the proper compression ratio is being achieved for a given cylinder state.

Figure 3:
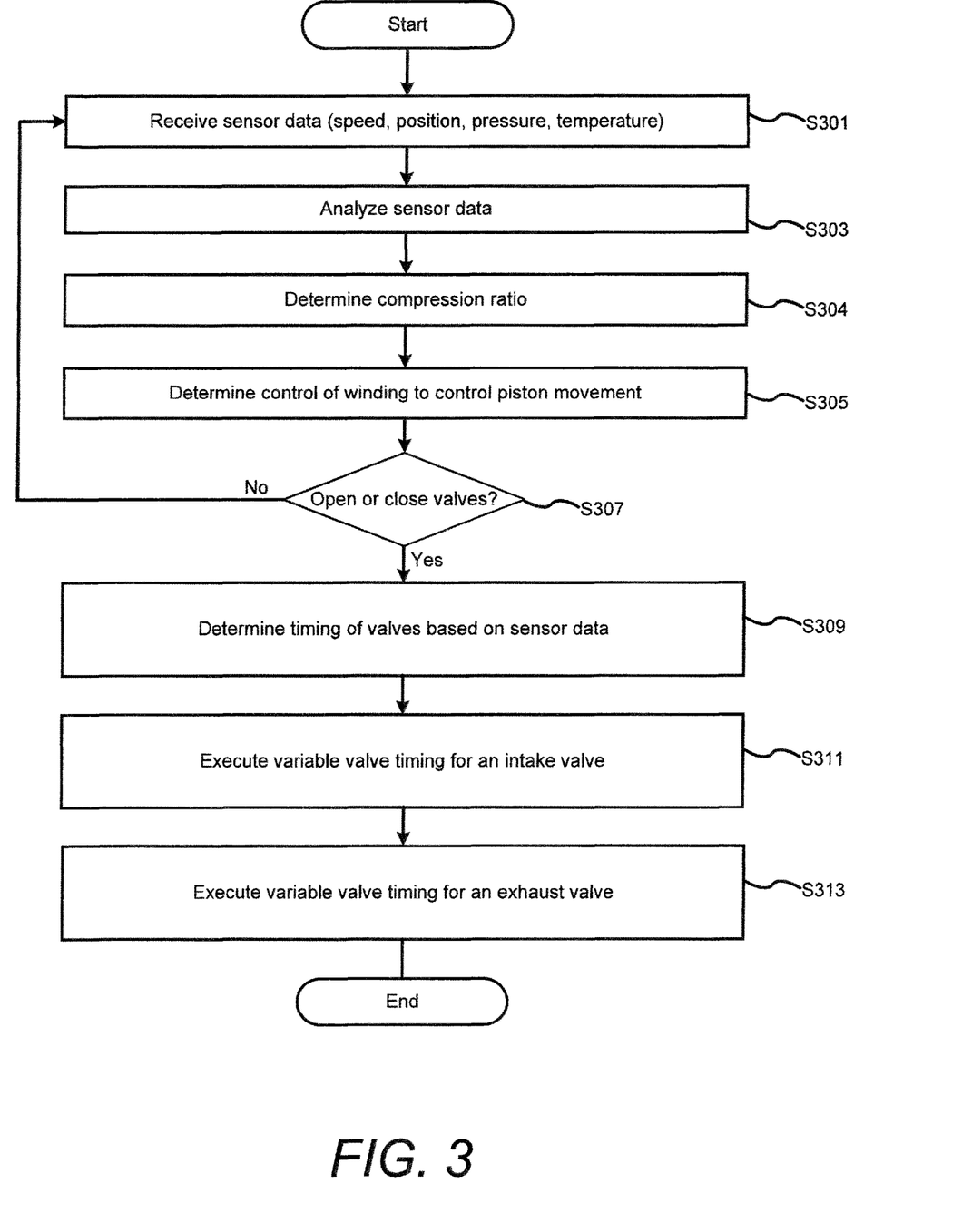
FIG. 3 is a flow chart for controlling an HCCI generator according to an embodiment of the present disclosure.

FIG. 3 is a flow chart for controlling a linear generator according to embodiments in accordance with the present disclosure. The HCCI generator control starts when the HCCI reaches an initial compression ratio that corresponds with ignition of fuel within the cylinder. For example an initial compression ratio is reached after the pistons reciprocate back and forth within the cylinder four times to develop momentum.

In embodiments, the controller receives data from the sensors (S301). The sensors can measure the position of the first piston, a speed of the first piston, a pressure of the first cylinder and a temperature of the first cylinder.

The controller can analyze the sensor data (S303) to determine a compression ratio of the HCCI generator during the current cycle (S304)

The controller in embodiments determines an EMF to be applied to the linear electromagnetic machine to control the movement of the piston (S305). The compression ratio of a current cycle can be controlled by controlling the piston motion such as a piston velocity and position. The piston velocity and position can be controlled via a set of windings. The windings can change the speed of the pistons by applying an electromagnetic force (EMF) on the magnet to slow down or speed up the pistons. Additionally or alternatively, a compression ratio can be produced by controlling an amount of EMF to be applied to the piston to initiate homogenous ignition in a predicted/desired cylinder state. A subsequent cylinder state can be predicted using system dynamics that considers a current cylinder state, which is characterized by the piston speed, velocity, cylinder temperature and/or pressure.

The controller determines whether the valves and should be opened or closed based on the sensor data and the compression ratio determined in the previous steps (S307).

When the valves are determined to be opened or closed the controller determines the timing of the opening and closing of the valves (S309).

Further, based on the cylinder state, the variable valve timing process can be executed for controlled opening and/or closing of the intake valves to allow fuel to enter the cylinders so a stable cylinder state is achieved.

Similarly the variable valve timing process can be executed for the exhaust valves to allow exhaust gas to exit the cylinders so a stable cylinder state is achieved (S313). Steps S301-S313 can be iterated for additional combustion cycles.

The VVT process for the exhaust valves can also involve determination of a scavenging efficiency. A scavenging efficiency is defined as the ability of the piston to relieve the cylinder of all exhaust gases during the exhaust stroke. In order to reduce the scavenged temperatures high scavenging efficiencies should be used. If high scavenging temperatures are present in the cylinder, the likelihood of pre-ignition is more likely due to increased heat transfer to the air-fuel mixture. As such, by controlling the timing the exhaust valves the scavenging efficiency can be increased. The longer the valves are opened, the greater the scavenging efficiency. Based on the compression ratio the system can use, the valve could be opened for maximum time to allow for the release of maximum exhaust gases. Additionally, the cylinder and exhaust valves can be arranged such that a given exhaust valve is positioned centralized over its respective piston, to maximize scavenging efficiency.

In addition, a desired HCCI cylinder state characterized by the piston speed and position, cylinder pressure and temperature, and other factors that can affect total cylinder energy such as the temperature of the cylinder walls, the cylinder air, the piston, and so on, can be affected and/or created using a steam cycle. In a steam cycle system, water from a water tank may be injected into the cylinder to cool the engine. The water injection (e.g., mass and duration) can be controlled by the controller 40 based on the number of cycles of the HCCI generator. For example, the steam cycle is activated at a sixth stroke. Such steam cycle integration into the HCCI generator can eliminate use of a separate cooling system.

Analyzing temperature and pressure readings of the cylinders to control fuel injection timing and mass, water injection timing and mass, valve timing, and compression ratio for each combustion cycle is complex. The complexity of the control increases further, as each of the systems are controlled. To develop an optimum control process for control of different components of the HCCI generator 100 can involve rigorous testing and learning algorithms to ensure the systems work together to provide desirable and stable cylinder states.

Figure 4:
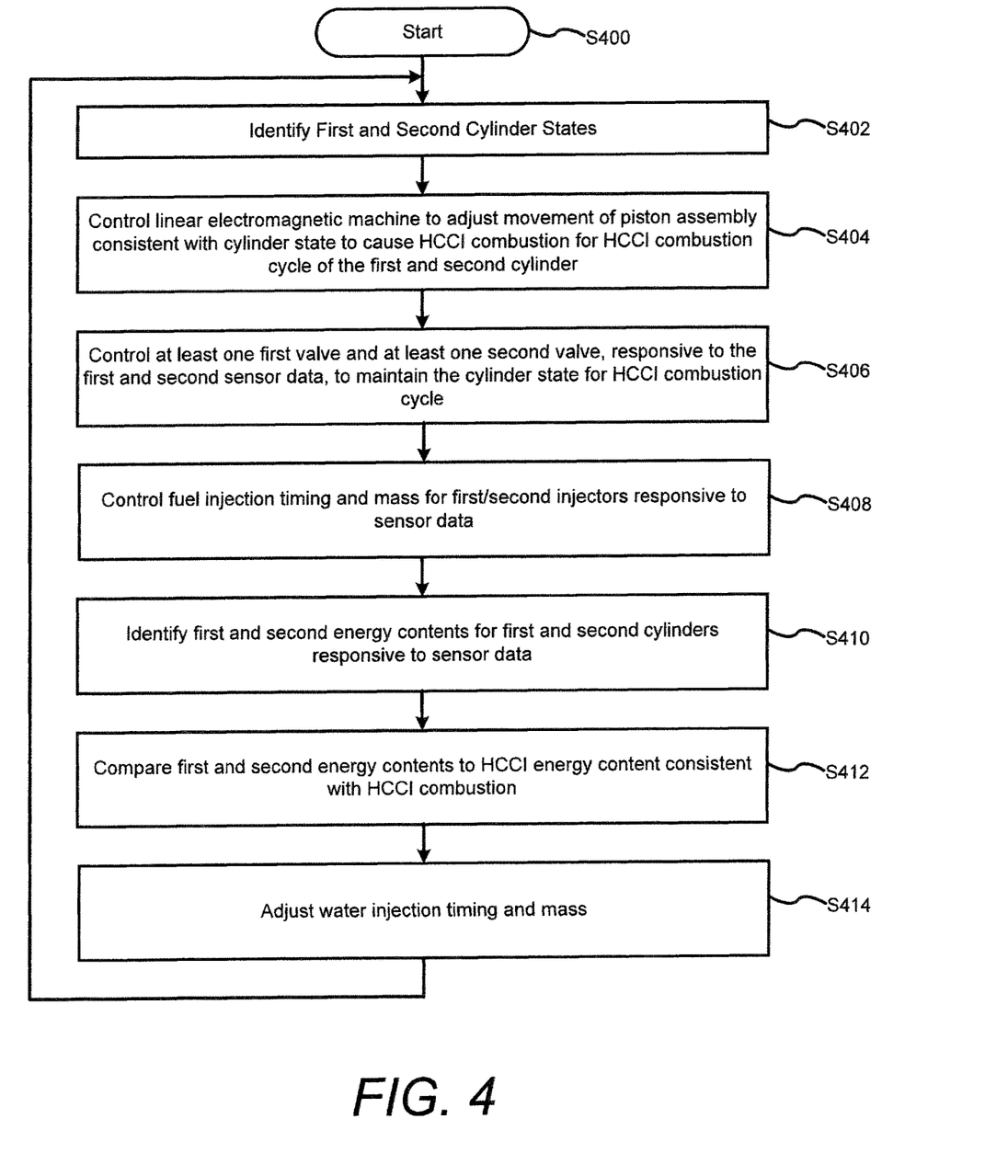
FIG. 4 is a flow chart for controlling an HCCI generator according to another embodiment of the present disclosure.

FIG. 4 is a flow chart 400 for controlling a linear generator according to an example embodiment of the present disclosure. The controller identifies first and second cylinder states (S402). For example, the controller identifies the first cylinder state based on first sensor data received from at least one first sensor coupled to a first cylinder of the housing, and identifies a second cylinder state based on second sensor data received from at least one second sensor coupled to a second cylinder of the housing.

The controller can control the linear electromagnetic machine to adjust movement of the piston assembly consistent with a desired HCCI cylinder state to cause HCCI combustion for each HCCI combustion cycle of the first and second cylinder (S404). For example, the controller can control, responsive to the first sensor data and the second sensor data, a linear electromagnetic machine to cause the piston assembly, which reciprocates in the housing, to enable a first piston of the piston assembly to reciprocate in the first cylinder and the second piston of the piston assembly to reciprocate in the second cylinder, to thereby adjust movement of the piston assembly and affect compression ratio, temperature, and/or other cylinder characteristics that can be influenced by piston movement.

The controller can control at least one first valve and at least one second valve, responsive to the first sensor data and the second sensor data, to maintain the desired HCCI cylinder state for each HCCI combustion cycle (S406).

The controller can control fuel injection timing and fuel injection mass for at least one first and second injectors responsive to the first sensor data and the second sensor data, to maintain the desired HCCI cylinder state for each HCCI combustion cycle (S408).

The controller can also identify first and second energy contents associated with the first and second cylinders responsive to the first and second sensor data, respectively (S410). The first and second energy contents correspond to energy content of first and second cylinder air, first and second cylinder lining, first and second piston, and other aspects of the linear generator that can affect HCCI combustion in a respective cylinder.

The controller can compare the first and second energy contents to a desired HCCI energy content consistent with the desired HCCI cylinder state (S412). For example, the controller can maintain data indicating desired HCCI cylinder states across a range of operating conditions of the linear generator.

The controller can adjust a water injection timing and mass for the first and second cylinders (S414). The controller can thereby inject a desired amount of water to adjust the first energy content and the second energy content to be consistent with the desired HCCI energy content, to maintain the desired HCCI cylinder state for each HCCI combustion cycle. Furthermore, the desired amount of water is to maintain an operating temperature of the linear generator via internal cylinder cooling. This enables operation of the linear generator without a need for a separate dedicated engine cooling system. Steps S402-S414 can be iterated for successive cycles.

Figure 5:
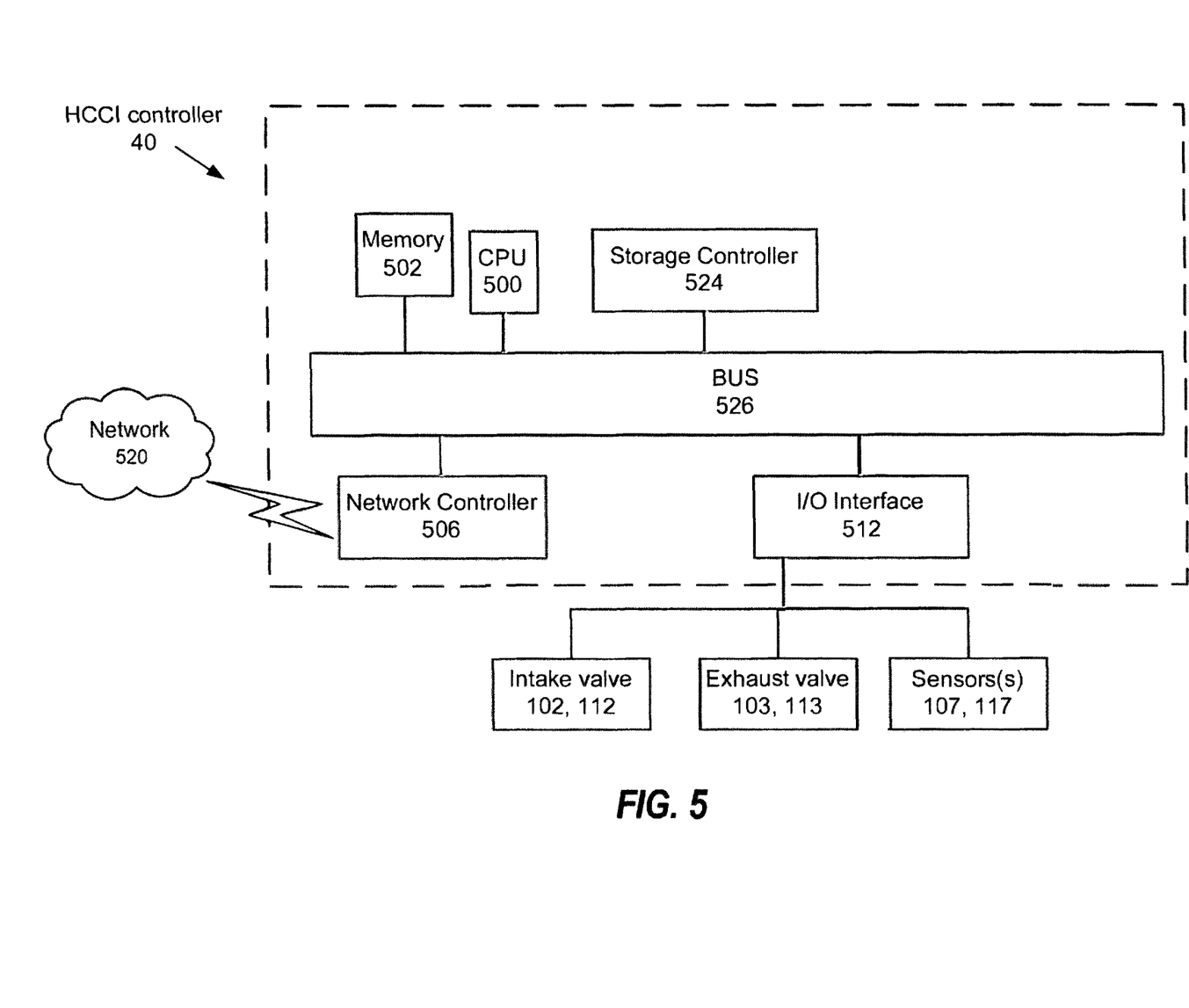
FIG. 5 is a block diagram illustrating an HCCI generator according to an embodiment of the present disclosure.

FIG. 5 is a block diagram illustrating the HCCI controller 40 according to an example embodiment of the present disclosure. In FIG. 5, the controller 40 includes a CPU 500 that is configured to receive inputs from the sensors 107 and 117 and process the data to activate the intake valves 102 and 112, and the exhaust valves 103 and 113. The data and instructions may be stored in the memory 502. Such data and instructions can include desired HCCI cylinder states for HCCI combustion cycles according to various engine operating conditions.

The hardware elements, in order to achieve the controller 40, can be realized by various circuitry elements, known to those skilled in the art. For example, CPU 500 is a single or multiple core hardware processor or other processor types. The CPU 500 may be implemented on an FPGA, ASIC, PLD or using discrete logic circuits. Further, CPU 500 may be implemented as multiple processors cooperatively working in parallel to perform the instructions of the processes described above with respect to FIGS. 3 and 4.

The controller 40, in FIG. 5, also includes a network controller 506 configured to for interface with a network 520. Such network based interfacing can be used to send commands, sensor data, or control related data to an external device such as a server for analyzing the control related data.

An input/output (I/O) interface 512 interfaces with the sensors 107 and 117, the intake valves 102 and 112, and the exhaust valves 103 and 113 to send and receive inputs or to send control signals to the intake valves 102 and 112, and the exhaust valves 103 and 113.

The storage controller 524 connects the memory 502 with communication bus 526, which may be an ISA, EISA, VESA, PCI, or similar device, for interconnecting all of the components of the controller 40. A description of the general features and functionality of the storage controller 524, network controller 506, and the I/O interface 512 is omitted herein for brevity.

The HCCI generator discussed in the present disclosure has several advantages over the traditional gasoline engine based and diesel engine based generators. The HCCI generator 100 uses sensors and algorithms to analyze and control a cylinder state through each operating cycle. The HCCI generator 100 can operate as either the main, or an emergency, generator for any vessel which utilizes batteries.

Due to the relatively small size of the HCCI generator 100 in comparison to diesel or spark ignition engines and its ability to start and stop nearly instantaneously in comparison to the foregoing common engines, the HCCI generator 100 can be implemented as a hybrid range extender. Due to a rapid power generation, the need for as many battery modules in an automobile, such as the TESLA (Tesla, Inc., Palo Alto, Calif.), may not be necessary. Therefore, using such a generator may even decrease the overall weight of such an automobile. Utilizing such a battery-generator combination would utilize increased freedom as to placement of components in the vehicle. Additionally, the fuel efficiency of such a generator would drive the up the fuel economy of vehicles on the road today, reducing pollution and greenhouse gas emissions.

According to embodiments of the present disclosure, the stator 110 can have approximately 95 (ninety-five) wire wraps. To determine an effectiveness of the HCCI generator 100 in the automotive and maritime industry, consider that 95 (ninety-five) wraps of 20G (twenty gauge) copper wire around an approximately 2" (two inch) stator would produce approximately, with a safety factor of 2 (two), a resistance of 0.3 (zero point three) Ohms.

Therefore, the equivalent resistance of the system would be 1 (one) Ohm. To determine the energy generated, Equation (1) can be used.

$$E = v^2/R * cpm * 60 \text{ min/hr} \tag{1}$$

From this, it would be expected approximately 90 kWh (ninety kilowatt hours) to be generated making it suitable for use in electric powered vehicles such as those currently produced in commercial quantities.

In regards to the fuel economy of the HCCI generator 100, it would be driven by the need for the HCCI portion to be at a stoichiometric mix. Stoichiometric mix for gasoline is generally considered to be 14.7 kg (fourteen point seven kilograms) air to 1 kg (one kilogram) of gasoline. Utilizing a two cylinder generator at 700 cpm (seven hundred cycles per minute), the expected gasoline usage would be about 3.2 gal/hr (three point two gallons per hour) of operation. This correlates to 107 kWh (one hundred seven kilowatt hours) of gasoline work. Generating about 90 kWh (ninety kilowatt hours) of generator output while utilizing 107 kWh (one hundred seven kilowatt hours) leads to 84% (eighty-four percent) efficient energy transfer. This efficiency does not take into account useful work generated by steam nor heat loss in wiring. Resulting energy to volume ratio would be about 910 kWh (nine hundred ten kilowatt hours) for every 1 m$^3$ (one cubic meter) of space.

Utilizing this generator as a range extender would significantly increase fuel economy while reducing the number of battery modules necessary to energize a vehicle such as commercially available electric vehicles.

While certain embodiments have been described, these embodiments have been presented by way of example only, and are not intended to limit the scope of the present disclosure. Indeed, the novel apparatuses and systems described herein can be embodied in a variety of other forms; furthermore, various omissions, substitutions and changes in the form of the apparatuses and systems described herein can be made without departing from the spirit of the present disclosures. The accompanying claims and their equivalents are intended to cover such forms or modifications as would fall within the scope and spirit of the present disclosure.

While a number of example embodiments of the present invention have been described, it should be appreciated that the present invention provides many applicable inventive concepts that can be embodied in a wide variety of ways. The example embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure and the knowledge of one of ordinary skill in the art.

Headings are solely used for convenience and should not be taken as limiting or restricting.

What is claimed is:

1. A linear generator comprising:
    a piston assembly having a first piston and a second piston disposed opposite the first piston in a housing;
    a rod connecting the first piston to the second piston to form the piston assembly, the piston assembly being linearly reciprocal between a first orientation, in which the first piston is disposed at a minimum inward position within a first cylinder defined by the housing and the second piston is disposed at a maximum outward position within a second cylinder defined by the housing, and a second orientation, in which the first piston is disposed at a maximum outward position within the first cylinder and the second piston is disposed at a minimum inward position within the second cylinder, the rod being constructed to interact with a linear electromagnetic machine to convert between kinetic and electrical energies;
    an injector assembly configured to, responsive to determination of at least one of speed, position, or temperature, control injection of fuel to achieve Homogenous Charge Compression Ignition (HCCI) combustion within the linear generator; and
    a controller including:
        a sensor module configured to identify a first cylinder state based on first sensor data from at least one first sensor disposed at the first cylinder, and configured to identify a second cylinder state based on second sensor data from at least one second sensor disposed at the second cylinder;
        an electromagnetic module configured to control the linear electromagnetic machine, responsive to the first sensor data and the second sensor data, to adjust movement of the piston assembly consistent with an HCCI cylinder state to cause HCCI combustion for each HCCI combustion cycle;
        a valve module configured to control at least one first valve disposed at the first cylinder and at least one second valve disposed at the second cylinder, responsive to the first sensor data and the second sensor data, to maintain the HCCI cylinder state for each HCCI combustion cycle;

an injector module configured to control fuel injection timing and fuel injection mass of the injector assembly, responsive to the first sensor data and the second sensor data, to maintain the HCCI cylinder state for each HCCI combustion cycle;

an energy module configured to identify, responsive to the first sensor data, a first energy content associated with the first cylinder corresponding to energy content of first cylinder air, first cylinder lining, and first piston; and to identify, responsive to the second sensor data, a second energy content associated with the second cylinder corresponding to energy content of second cylinder air, second cylinder lining, and second piston;

wherein the energy module is configured to compare the first energy content and the second energy content to an HCCI energy content consistent with the HCCI cylinder state;

wherein the injector module is configured to adjust a water injection timing and mass for the first cylinder and the second cylinder, to inject an amount of water to adjust the first energy content and the second energy content to be consistent with the HCCI energy content to maintain the HCCI cylinder state for each HCCI combustion cycle; and wherein the amount of water further is adjusted to maintain an operating temperature of the linear generator and enable operation of the linear generator without a need for a dedicated engine cooling system.

2. The linear generator according to claim 1, wherein the controller is configured to operate the linear generator at a speed of approximately 700 cycles per minute and low load with a compression ratio of approximately 1:14 to allow sufficient residence time for each HCCI combustion cycle proportional to the compression ratio and speed, consistent with the linear generator serving as a battery charger.

3. The linear generator according to claim 1, wherein the injector assembly includes at least one first fuel injector and at least one first water injector associated with the first cylinder, and at least one second fuel injector and at least one second water injector associated with the second cylinder.

4. The linear generator according to claim 1, wherein the injector module of the controller is to adjust the water injection timing and mass to provide a steam cycle to drive the piston assembly and extract work from heat energy to improve work efficiency and to improve exhaust scavenging efficiency by reducing scavenging temperatures.

5. The linear generator according to claim 1, wherein the injector module of the controller is configured to control fuel injection timing and fuel injection mass consistent with allowing sufficient residence time for development of low temperature reactions to maintain HCCI combustion for each HCCI combustion cycle.

6. The linear generator according to claim 1, wherein the electromagnetic module of the controller is configured to control the linear electromagnetic machine to adjust a compression ratio of the first cylinder and second cylinder to maintain HCCI combustion for each HCCI combustion cycle.

7. The linear generator according to claim 6, wherein the electromagnetic module of the controller is configured to control the linear generator to accommodate multiple different types of fuel by adjusting the compression ratio to maintain HCCI combustion to accommodate a given type of fuel.

8. The linear generator according to claim 1, wherein the linear electromagnetic machine includes a first stator and a second stator, and the electromagnetic module of the controller is configured to selectively induce an EMF, on a magnet of the linear electromagnetic machine that is coupled to the rod, via a first stator and a second stator of the linear electromagnetic machine, to cause the piston assembly to reciprocate to start operation of the linear generator.

9. The linear generator according to claim 1:
wherein the at least one first valve includes a first intake valve and a first exhaust valve disposed at the first cylinder, and wherein the at least one second valve includes a second intake valve and a second exhaust valve disposed at the second cylinder;
wherein the first exhaust valve is disposed in the first cylinder to be centralized over the first piston and is based on a uniflow scavenging system to maximize scavenging efficiency of the first cylinder;
wherein the second exhaust valve is disposed in the second cylinder to be centralized over the second piston and is based on the uniflow scavenging system to maximize scavenging efficiency of the second cylinder;
and wherein the valve module of the controller is configured to control individually a timing of the first exhaust valve and the second exhaust valve, analyze the first sensor data and the second sensor data to determine and control compression ratios in the first cylinder and the second cylinder, respectively, to cause HCCI compression ignition of a fuel and air mixture in the first cylinder and the second cylinder during respective compression strokes, by controlling movement of the piston assembly, timing of the first intake valve, timing of the second intake valve, timing of the first exhaust valve, and timing of the second exhaust valve.

10. The linear generator according to claim 1, wherein the valve module of the controller is configured to control at least one of the at least one first valve and the at least one second valve according to variable valve actuation (VVA) to provide optimal valve opening and closing sequences that vary across different operating conditions of the linear generator.

11. The linear generator according to claim 1, wherein the at least one first sensor and the at least one second sensor include at least one of a speed sensor, a position sensor, a temperature sensor, or a pressure sensor.

12. The linear generator according to claim 1, wherein the first sensor data includes at least one of a first piston position, a first piston speed, a first cylinder pressure, and a first cylinder temperature, and the second sensor data includes at least one of a second piston position, a second piston speed, a second cylinder pressure, and a second cylinder temperature.

13. The linear generator of claim 1, wherein the housing is constructed from a plurality of first blocks bolted together to form the first cylinder, and a plurality of second blocks bolted together to form the second cylinder, wherein the first and second blocks are produced by additive manufacturing 3D printing.

14. The linear generator of claim 13, wherein the housing is produced by additive manufacturing 3D printing using polylactic acid (PLA).

15. A method for controlling a linear generator, the method comprising:
identifying a first cylinder state based on first sensor data received from at least one first sensor coupled to a first cylinder of a housing;

identifying a second cylinder state based on second sensor data received from at least one second sensor coupled to a second cylinder of the housing;

controlling, responsive to the first sensor data and the second sensor data, a linear electromagnetic machine including a winding coupled to the housing and a magnet coupled to a piston assembly, which reciprocates in the housing, to enable a first piston of the piston assembly to reciprocate in a first cylinder of the housing and a second piston of the piston assembly to reciprocate in a second cylinder of the housing, to adjust movement of the piston assembly consistent with an HCCI cylinder state to cause Homogenous Charge Compression Ignition (HCCI) combustion for an HCCI combustion cycle of the first cylinder and the second cylinder;

controlling at least one first valve associated with the first cylinder, and at least one second valve associated with the second cylinder, responsive to the first sensor data and the second sensor data, respectively, to maintain the HCCI cylinder state for the HCCI combustion cycle;

controlling fuel injection timing and fuel injection mass for at least one first injector associated with the first cylinder and at least one second injector associated with the second cylinder, respectively responsive to the first sensor data and the second sensor data, to maintain the HCCI cylinder state for the HCCI combustion cycle;

identifying, responsive to the first sensor data, a first energy content associated with the first cylinder and corresponding to an energy content of first cylinder air, a first cylinder lining, and the first piston;

identifying, responsive to the second sensor data, a second energy content associated with the second cylinder and corresponding to an energy content of second cylinder air, a second cylinder lining, and the second piston;

comparing the first energy content and the second energy content to an HCCI energy content consistent with the HCCI cylinder state;

adjusting a water injection timing and mass for the first cylinder and for the second cylinder, to inject an amount of water to adjust the first energy content and the second energy content to be consistent with the HCCI energy content and to maintain the HCCI cylinder state for the HCCI combustion cycle; and maintaining an operating temperature of the linear generator with the water injected in the first cylinder and in the second cylinder.

16. A linear generator comprising:

a housing including a first cylinder and a second cylinder formed by additive manufacturing 3D printing and disposed at opposite ends of the housing;

a piston assembly disposed in the housing and including a first piston and a second piston formed at opposite ends of the piston assembly, wherein the piston assembly reciprocates in the housing to enable the first piston to reciprocate in the first cylinder, and to enable the second piston to reciprocate in the second cylinder;

a linear electromagnetic machine including a winding coupled to the housing and a magnet coupled to the piston assembly, that directly converts kinetic energy of the piston assembly into electrical energy, and that directly converts electrical energy into kinetic energy of the piston assembly;

at least one first valve associated with the first cylinder, and at least one second valve associated with the second cylinder;

at least one first sensor coupled to the housing at the first cylinder that provides first sensor data, wherein the at least one first sensor includes a first hall effect sensor to sense a position of the magnet;

at least one second sensor coupled to the housing at the second cylinder that provides second sensor data, wherein the at least one second sensor includes a second hall effect sensor to sense the position of the magnet;

an injector assembly configured to, responsive to determination of at least one of speed, position, or temperature, control injection of fuel to achieve Homogenous Charge Compression Ignition (HCCI) combustion within the linear generator; and a controller including:
  a position module configured to identify a piston assembly position based on said sensed position of the magnet;
  a valve module configured to control the at least one first valve and the at least one second valve electronically, responsive to the piston assembly position, to selectively admit fluid into the first cylinder and the second cylinder to cause the piston assembly to automatically reciprocate;
  a sensor module configured to identify a first cylinder state based on the first sensor data, and configured to identify a second cylinder state based on the second sensor data;
  an injector module configured to control fuel injection timing and fuel injection mass of the injector assembly, responsive to the first sensor data and the second sensor data, to maintain an HCCI cylinder state for each HCCI combustion cycle; and
  an energy module configured to identify, responsive to the first sensor data, a first energy content associated with the first cylinder corresponding to energy content of first cylinder air, first cylinder lining, and first piston; and to identify, responsive to the second sensor data, a second energy content associated with the second cylinder corresponding to energy content of second cylinder air, second cylinder lining, and second piston;
  the energy module being configured to compare the first energy content and the second energy content to an HCCI energy content consistent with the HCCI cylinder state;
  the injector module being configured to adjust a water injection timing and mass for the first cylinder and the second cylinder, to inject an amount of water to adjust the first energy content and the second energy content to be consistent with the HCCI energy content to maintain the HCCI cylinder state for each HCCI combustion cycle; and
  the amount of water being adjusted to maintain an operating temperature of the linear generator;
  the linear generator being free of a dedicated engine cooling system; and
the linear electromagnetic machine directly generating electricity from said automatic reciprocation of the piston assembly via the linear electromagnetic machine.

17. The linear generator according to claim 16, wherein the at least one first valve and the at least one second valve have variable valve actuation, controlled by the valve module of the controller, and are mechanically decoupled from the piston assembly.

\* \* \* \* \*